US009463747B2

(12) United States Patent
Chen et al.

(10) Patent No.: US 9,463,747 B2
(45) Date of Patent: Oct. 11, 2016

(54) COMPARTMENT PANEL ASSEMBLY AND VEHICLE EMPLOYING THE SAME

(71) Applicant: FORD GLOBAL TECHNOLOGIES, LLC, Dearborn, MI (US)

(72) Inventors: Charlene Chen, Nanjing (CN); Frank Wu, Nanjing (CN); Peter Zhang, Nanjing (CN); Tom Xu, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/847,071

(22) Filed: Sep. 8, 2015

(65) Prior Publication Data
US 2016/0083020 A1    Mar. 24, 2016

(30) Foreign Application Priority Data
Sep. 18, 2014    (CN) .......................... 2014 1 0480092

(51) Int. Cl.
| | |
|---|---|
| *B60N 2/00* | (2006.01) |
| *B60R 5/04* | (2006.01) |
| *B60N 2/22* | (2006.01) |
| *B62D 25/08* | (2006.01) |
| *B60R 5/00* | (2006.01) |

(52) U.S. Cl.
CPC . *B60R 5/04* (2013.01); *B60N 2/22* (2013.01); *B60R 5/006* (2013.01); *B62D 25/087* (2013.01)

(58) Field of Classification Search
CPC ........... B60R 5/04; B60R 5/006; B60N 2/22; B62D 25/087
USPC .................................... 296/37.16, 37.1, 37.8
See application file for complete search history.

(56) References Cited

U.S. PATENT DOCUMENTS

| | | | | |
|---|---|---|---|---|
| 4,256,340 | A * | 3/1981 | Dunchock ................. | B60R 7/04 296/37.15 |
| 5,716,091 | A * | 2/1998 | Wieczorek ................ | B60R 7/02 224/275 |
| 2003/0057724 | A1* | 3/2003 | Inagaki ..................... | B60R 7/02 296/37.8 |
| 2006/0255611 | A1* | 11/2006 | Smith ....................... | B60N 2/36 296/37.16 |
| 2015/0145272 | A1* | 5/2015 | Cleary ...................... | B60N 3/14 296/37.16 |

FOREIGN PATENT DOCUMENTS

| | | |
|---|---|---|
| CN | 202912214 | 5/2013 |
| DE | 29803305 | 8/1998 |
| DE | 102011111398 | 2/2013 |
| JP | H08275845 | 10/1996 |
| JP | 2004351961 | 12/2004 |
| KR | 20010057289 | 7/2001 |
| WO | 2005085005 | 9/2005 |

* cited by examiner

*Primary Examiner* — Joseph D Pape
(74) *Attorney, Agent, or Firm* — Gregory P. Brown; Law Firm of Dr. Junqi Hang, PLC

(57) ABSTRACT

The present invention in one or more embodiments provides a compartment panel assembly to be positioned between one or more seats and a trunk storage of a vehicle. The compartment panel includes a panel portion, a protruding portion extending from the panel portion and including a first wall which defines thereupon a first aperture, and a first storage container to be at least partially received through the first aperture. The present invention in one or more embodiments is advantageous positioned in providing effective storage within the vehicle interior, and in particular providing storage spaces that are lockable and/or not directly visible for enhanced storage security.

15 Claims, 3 Drawing Sheets

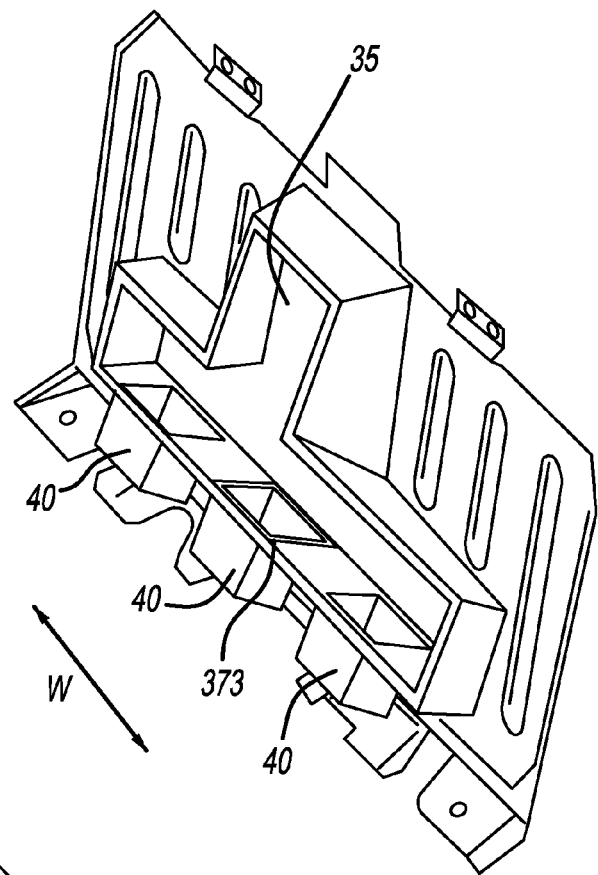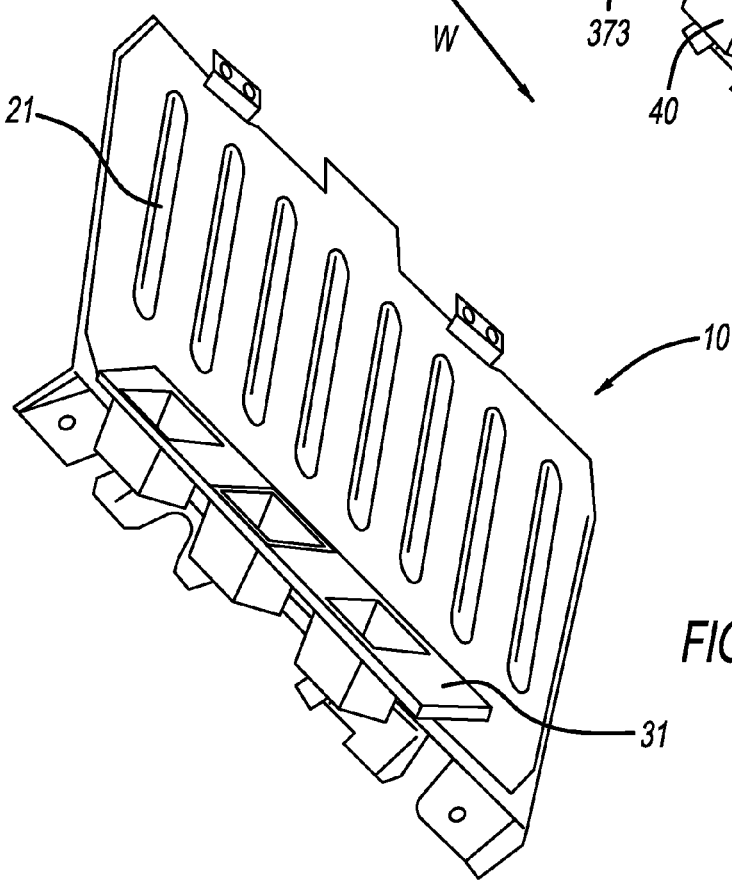

COMPARTMENT PANEL ASSEMBLY AND VEHICLE EMPLOYING THE SAME

RELATED APPLICATION(S)

This application claims the benefit of Chinese New Invention Patent Application No.: CN201410480092.8, filed on Sep. 18, 2014, the entire contents thereof being incorporated herein by reference.

TECHNICAL FIELD

The present invention relates to a panel assembly to be positioned between one or more seats and a trunk storage of a vehicle, and a vehicle employing the same.

BACKGROUND

Figure 1:
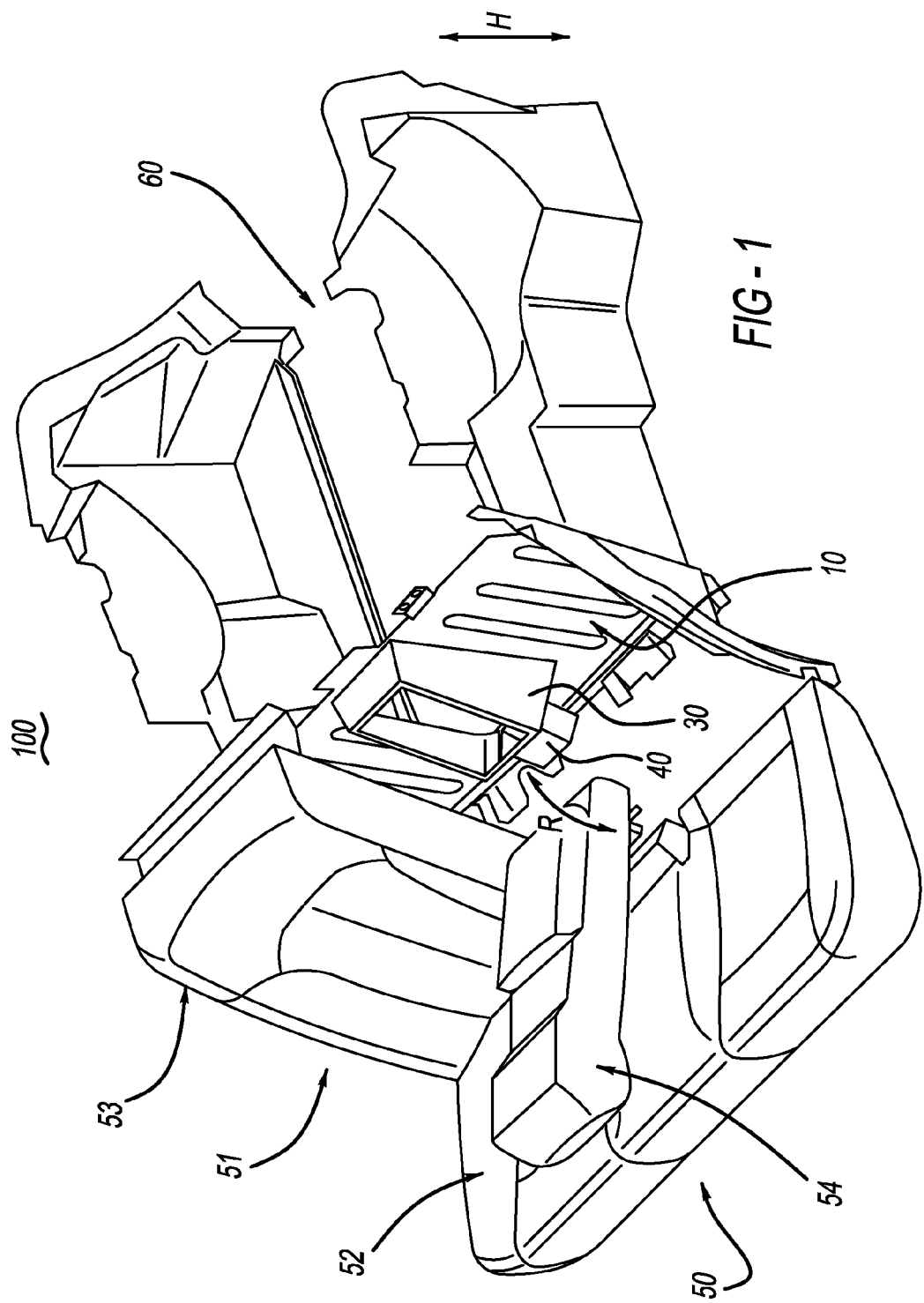

In response to advances in automotive technology and enhanced requirement for safety and comfort, certain vehicles have been provided with rear seats with angle-changeable seatback, and certain other vehicles in the luxury line have been provided with extra seating, improved ventilation and added messaging capacities. Accordingly a number of electronic devices may have been implemented to these vehicles. Separation panels may be provided in these vehicle to be positioned between the rear seats and the trunk storage so as to reduce the occurrence of unwanted entry of items from the trunk storage into the area where the electronic devices may be present.

SUMMARY

In one or more embodiments, a compartment panel assembly is provided to be positioned between one or more seats and a trunk of a vehicle, where the compartment panel assembly includes a panel portion, a protruding portion extending from the panel portion and including a first wall with a first aperture, and a first container at least partially receivable through the first aperture.

The first container may be detachably receivable through the first aperture.

The protruding portion may include an opening separate from the first aperture.

The opening and the first aperture may extend in two different directions.

The protruding portion may include a second wall with a second aperture to at least partially receive a second container.

The first and second apertures may extend in two different directions.

One of the first and second walls may be provided with a pair of non-parallel sides.

The panel portion may include one or more reinforcing bars.

The one or more reinforcing bars may protrude away from the protruding portion.

The first aperture may be positioned closer to a bottom edge than an upper edge of the panel portion.

The panel portion may further include one or more attachment tabs extending from at least one of the upper edge and the bottom edge.

The first wall may include first and second portions which further include respectively the first aperture and a second aperture, the second aperture being spaced apart from the first aperture and to receive a second container.

The first and second portions may be separate and spaced apart from each other.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein:

FIG. 1 illustratively depicts a partial perspective view of a vehicle employing a compartment panel assembly according to one or more embodiments of the present invention;

FIG. 2A illustratively depicts a perspective view of the compartment panel assembly referenced in FIG. 1;

FIG. 2B illustratively depicts two partial cross-sections of a protruding portion of the compartment panel assembly referenced in FIG. 2A;

FIG. 3 illustratively depicts another perspective view of the compartment panel assembly referenced in FIG. 1; and FIG. 4 illustratively depicts yet another perspective view of the compartment panel assembly referenced in FIG. 1.

DETAILED DESCRIPTION OF ONE OR MORE EMBODIMENTS

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is advantageous at least in providing a compartment panel assembly to be positioned between one or more rear seats and a trunk storage of a vehicle, where the compartment panel is believed to not only be avoiding occurrences of items from the trunk storage to unfavorably contact the rear seat back, and also to provide storage spaces with desirable security. This design is believed to be particularly beneficial in situations where the rear seats are with angle-changeable seatbacks, because additional spaces may be available for accommodating positional changes of the seatbacks and accordingly more spaces may be available in this area for storage.

FIG. 1 illustratively depicts a perspective view of a vehicle 100 including a compartment panel assembly 10 according to one or more embodiments. The vehicle 100 includes a seat assembly 50, a trunk storage 60 and the compartment panel assembly 10 positioned there-between. The seat assembly 50 as shown in FIG. 1 is representative of one or more rear seats often positioned in the rear row of the passage compartment. The seat assembly 50 may take any form, shape, construction or material. A particular benefit of the present invention as shown in FIG. 1 is that one or more seats such as seat 51 included in the seat assembly 50 may recline toward or away from the trunk storage 60 and therefore the space allotted between such reclining seat and the compartment panel assembly 10 may be utilized for article storage as will be detailed herein elsewhere.

Referring back to FIG. 1, in a non-limiting example, the seat assembly 50 includes a seat 51 with a seat base 52 and a seat back 53 and a central armrest 54. The center armrest 54 is optionally part of the seat assembly 50 and positioned between the seat backs 53. The central armrest 54 may itself function as a seat back of the seat 51 at a retracted position. In certain embodiments, the central armrest 54 itself or a portion thereof may pivot toward or away from the compartment panel assembly 10 in direction "R." When being pivoted away from the trunk storage 60, a portion of the compartment panel assembly 10 is exposed for accessing to a hidden storage such as the first storage container 40 as detailed herein elsewhere. When the central armrest 54 is pivoted toward the compartment panel assembly 10, the hidden storage such as the first container 40 is kept away from plain eyesight. Additionally, one or more of the seat backs 53 may also pivot away or toward the compartment panel assembly 10 such that additional hidden storage may also be provided as detained herein elsewhere.

Figure 2A:
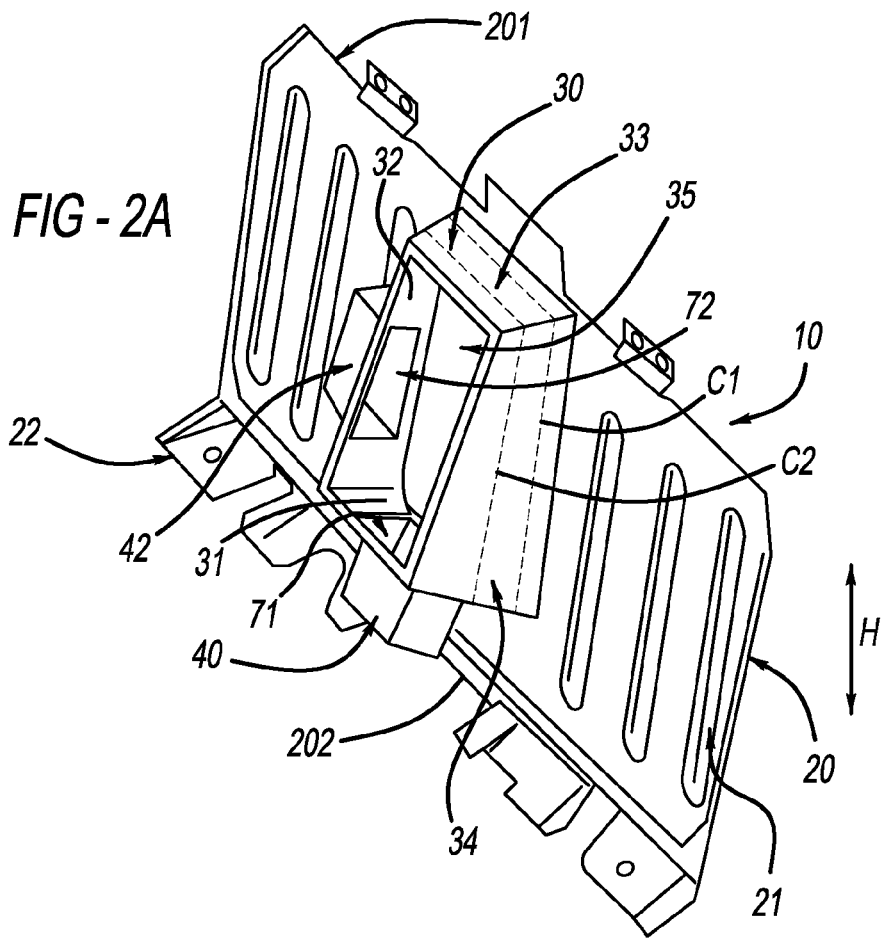

In view of FIG. 1, FIG. 2A illustratively depicts a perspective view of the compartment panel assembly 10. The compartment panel 10 includes a panel portion 20, a protruding portion 30 extending from the panel portion 20 and including a first wall 31 which defines thereupon a first aperture 71, and a first storage container 40 to be at least partially received through the first aperture 71.

The panel portion 20 may vary in shape, dimension and material as needed. In general, the panel portion 20 is the main part of the compartment panel assembly 10 separating the seat assembly 50 and the trunk storage 60. In certain embodiments, and as illustratively depicted in FIG. 2A, the panel portion 20 is defined by an upper edge 201 and a bottom edge 202 along a height direction "H" of the vehicle 100. The panel portion 20 may further include one or more connecting tabs 22 extending out from the bottom edge 202 for connection or fixation to a vehicle floor (not shown). One or more connecting tabs 24 may extend from the upper edge 201 and to be used for connection to a vehicle roof panel (not shown).

In certain embodiments, and as illustratively depicted in FIG. 1 and FIG. 2A, the panel portion 20 may further include one or more reinforcing bars 21 to enhance an overall strength of the panel portion 20. In one or more embodiments, the reinforcing bars 21 may be of an elongated shape extending along a vehicle height direction "H" and may in certain embodiments be of any other suitable shapes as desirable. The one or more reinforcing bars 21 may be integral to and in material continuation with the panel portion 20, and alternatively may be of a separate construction subsequently deposited onto the panel portion 20. The one or more reinforcing ribs 21 may protrude toward the trunk storage 60 to provide additional enhancement to the overall strength of the panel portion 20.

The protruding portion 30 does not have to be limited to any particular shape, material or dimension. For instance, the protruding portion 30 may be of a cross-sectional shape of a rectangle, a square, a triangle, a trapezoid, or any suitable geometrical shape. One consideration is however that the protruding portion 30 be compatible with the space available between the panel portion 20 and the seat assembly 50 and in particular the central armrest 54 of the seat assembly 50. In other words, the protruding portion 50 is so dimensioned and positioned as not to interfere with a pivoting movement of the central armrest 54 toward or away from the compartment panel assembly 10.

In this connection, and as detailed herein below, a tapered polyhedral with a trapezoid cross-section may be one of those shapes suitable for the protruding portion 30 positioned between the central armrest 54 and the panel portion 20. In particular, and as illustratively depicted in FIG. 2A, the term "tapered polyhedral with a trapezoid cross-section" refers to a non-limiting shape of the protruding portion 30 defined with the first wall 31, a second wall 32, a third wall 33 and a fourth wall 34. A cross-section "C1" and a cross-section "C2" of the protruding portion 30 are depicted together in FIG. 2B for illustration purposes. The cross-section "C1" is closer in position relative to the trunk storage 60 than the cross-section "C2." Referring back to FIG. 2B, the cross-section "C1" is defined by edges 281, 282, 283 and 284. The cross-section "C2" is defined by edges 291, 292, 293 and 294. Common to both the cross-sections "C1" and "C2" are relatively longer tail edges 281 and 291 in comparison to head edges 283 and 293, respectively, where the tail edges 281 and 291 are positioned closer to the vehicle floor or the wheels than the head edges 283 and 293.

Figure 2B:
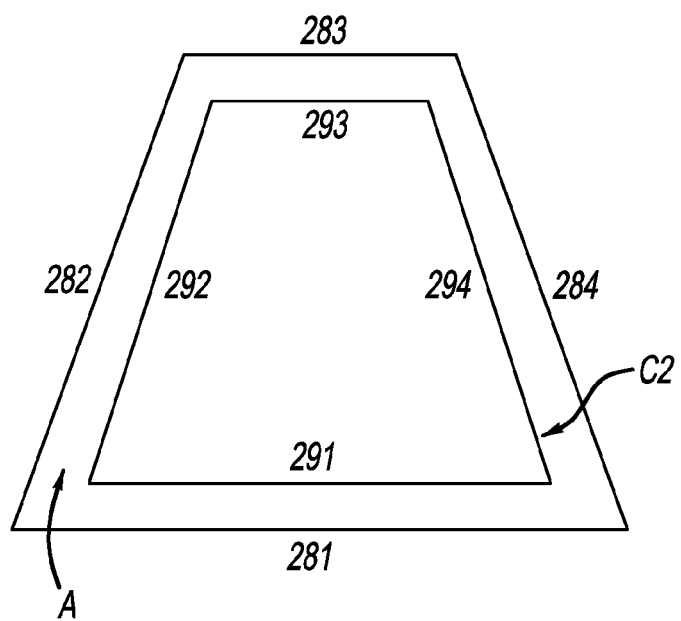

The term "tapered polyhedral with a trapezoid cross-section" also refers to a non-limiting shape of the protruding portion 30 as illustratively depicted in FIG. 2B, where at least one of the four edges 291, 292, 293 and 294 of the cross-section "C2" is positioned within the area "A" defined by the four edges 281, 282, 283 and 284 of the cross-section "C1." In certain instances, at least one of the following is true: the edge 291 is shorter in length than the edge 281; the edge 292 is shorter in length than the edge 282; the edge 293 is shorter in length than the edge 283; and the edge 294 is shorter in length than the edge 284.

Referring back to FIG. 2A, the first wall 31 defines thereupon a first aperture 71. Relative to an upper edge 201 of the panel portion 20, the first aperture 71 may be positioned closer to the bottom edge 202 of the panel portion 20. Although being illustratively depicted to be of a rectangle in shape, the first aperture 71 may be of any suitable shapes, with non-limiting examples thereof including circle, square, triangle and any other geometrical shapes. In certain embodiments, and as illustratively depicted in FIG. 2A, the second wall 32 is also provided with a second aperture 72 to receive a second container 42 for additional storage with relatively easy access through the opening 35 defined upon the protruding portion 30, wherein the opening 35 may be in alignment with the seat back 53 and/or the central armrest 54 along a vehicle longitudinal direction. Although only the first and second walls 31, 32 are depicted in FIG. 2A as including storage container, additional storage containers may be provided to the third or fourth walls 33, 34 as necessary and suitable. Moreover, more than one storage container may be provided to any of the walls 31, 32, 33 and 34.

In one or more embodiments, and when the second storage container 42 has been assembled onto the second aperture 72, the second storage container 42 may be provided with an end portion, an extending direction thereof relative to the vehicle floor being of an angle of no greater than 90 degrees so as to avoid items stored within the second storage container 42 from falling out undesirably. The opening 35 of the protruding portion 30 is spaced apart from the first aperture 71 and the second aperture 72. Accordingly, space at or around the protruding portion 30 in various directions may be advantageously used and taken advantage of.

Referring back to FIG. 2A, the first container 40 may be made integral to or be detachable from the first wall 31. When detachable, the first container 40 may be connected to the first wall 31 via the first aperture 31 via any suitable method, such as hooks, releasable adhesive strips and/or buttons. In the particular case of the first container 40 which tends to rest against the first aperture 71 via the natural force of gravity, the first container 40 may be configured to have a flared edge such as flared edge 373 depicted in FIG. 3 for sitting against the first aperture 71.

In certain embodiments, the protruding portion 30 may be positioned at a location relatively central to the panel portion 20, and the protruding portion 30 is to align with the central armrest 54. Accordingly, one may be provided with readily access to the first storage container 40 via the opening 35 when the central armrest 54 is in a down position. In one or more embodiments, the protruding portion 30 may be positioned at any suitable locations on the panel portion 20, such as one side of the panel portion 20 so as to be aligned with the seat 51. Accordingly, access may also be made to the first storage container 40 when the seat 51 is down.

Further, and as illustratively depicted in FIG. 3, the protruding portion 30 may be configured such that the first wall 31 extends in a width dimension "W" behind the one or more of the seat backs 51, wherein another or more storage containers similar to the first storage container 40 may be received there for additional storage.

Alternatively also, and instead of having an extended first wall, the first wall 31 may be configured as separate and spaced apart portions (not shown) along the width direction "W" to receive and support a storage container such as the first storage container 40.

In one or more embodiments, and as mentioned herein elsewhere, the one or more first storage container 40 may be detachably connectable to the one or more protruding portions 30. In certain embodiments, these detachable containers such as the first storage container 40 and the second storage container 42 may be configured as integral to the panel portion 20 for consideration in favor of cost and assembly efficiencies. In certain other embodiments, some of these containers may be configured as detachable from the panel portion 20, and some other may be integral to the panel portion 20.

Many of the embodiments have been discussed in relation to the protruding portion 30 as illustratively depicted in FIG. 1, FIG. 2A and FIG. 3. The protruding portion 30 may be reduced or simplified, as illustratively depicted in FIG. 4, to include or consist of the first wall 31, in which the first wall 31 with the first aperture 71 extends from the panel portion 20 and supports one or more of storage container such as the first storage container 40. In certain embodiments, these detachable containers such as the first storage container 40 may be made integral to the panel portion 20 for consideration of cost and assembly efficiencies. Length of the first wall 31 may vary with available spaces between the panel portion 20 and one or more of the seats 51. Furthermore, the first wall 31 may be aligned with the pivotable seatback 53 and/or the central armrest 54 along a vehicle length direction. Similar to what is described in relation to FIG. 3 or FIG. 4, the first wall 31 may be configured to include two or more spaced apart portions to support thereupon the one or more storage containers. In non-limiting examples, the first wall 31 may include first and second portions respectively including first and second apertures, where the first and second apertures are spaced apart from each other and are to receive first and second storage containers. The first and second portions may also be spaced apart from each other.

To add additional security, any of the storage containers described herein such as the first and second storage containers 40, 42 may further be provided with a cover or lid, optionally lockable.

The compartment panel assembly 10 may be formed of any suitable materials in favor of durability. For instance, the compartment panel assembly 10 or any portions thereof may include or be constructed of a suitable metal with non-limiting examples thereof including steel and copper, and/or of a suitable non-metal with non-limiting examples thereof including plastics and carbon.

In one or more embodiments, the present invention as set forth herein is believed to provide an assembly via which storage spaces are made advantageously available within a vehicle interior. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A compartment panel assembly, comprising, when positioned within a vehicle at an assembled position:
   a panel portion positioned between a rear-row seat and a trunk of the vehicle;
   a protruding portion including a first wall extending from the panel portion along a vehicle-length direction and defining thereupon a first aperture with a depth thereof extending along a vehicle-height direction; and
   a first container supported on the first wall and sitting through the first aperture.

2. The compartment panel assembly of claim 1, wherein the first container is detached away from the first aperture at a dissembled position.

3. The compartment panel assembly of claim 1, wherein the protruding portion includes a second wall extending from the panel portion along the vehicle-length direction and being at a right angle relative to the first wall, the second wall defining thereupon a second aperture with a depth thereof extending along a vehicle-width direction.

4. The compartment panel assembly of claim 1, wherein the panel portion includes one or more reinforcing bars extending along the vehicle-height direction.

5. The compartment panel assembly of claim 4, wherein the one or more reinforcing bars protrude away from the protruding portion along the vehicle-length direction.

6. The compartment panel assembly of claim 1, wherein the first aperture is positioned closer to a bottom edge than an upper edge of the panel portion.

7. The compartment panel assembly of claim 6, wherein the panel portion further includes one or more attachment tabs extending from the bottom edge to be attached to a vehicle floor at the assembled position.

8. The compartment panel assembly of claim 1, wherein the first wall includes first and second portions which further include respectively the first aperture and a second aperture, the second aperture being spaced apart from the first aperture along a vehicle-width direction.

9. The compartment panel assembly of claim 8, wherein the first and second portions are separate and spaced apart from each other along the vehicle-width direction.

10. A vehicle, comprising:
    a trunk;
    two rear-row seats and an armrest positioned there-between; and
    a compartment panel assembly positioned between the trunk and the armrest, the compartment panel including a panel portion extending along a vehicle-height direction, a protruding portion including a first wall extending from the panel portion along a vehicle-length direction and defining thereupon a first aperture with a depth thereof extending along a vehicle-height direction, and a first container supported on the first wall and sitting through the first aperture.

11. The vehicle of claim 10, wherein the protruding portion includes a second wall extending from the panel portion along the vehicle-length direction and being at a right angle relative to the first wall, the second wall defining thereupon a second aperture with a depth thereof extending along a vehicle-width direction.

12. The compartment panel assembly of claim 1, further comprising a second wall, a third wall and a fourth wall each extending from the panel portion along the vehicle-length direction, wherein the first, second, third and fourth walls together define therein a window opening via which access to the first aperture is obtained.

13. The compartment panel assembly of claim 12, wherein the window opening includes a first cross-section and a second cross-section positioned between the first cross-section and the panel portion along the vehicle-length direction, the first cross-section being smaller in perimeter than the second cross-section.

14. The vehicle of claim 10, further comprising a second wall, a third wall and a fourth wall each extending from the panel portion along the vehicle-length direction, wherein the first, second, third and fourth walls together define therein a window opening positioned behind the armrest and via which access to the first aperture is obtained when the armrest is at a folded-down position.

15. The vehicle of claim 14, wherein the window opening includes a first cross-section and a second cross-section positioned between the first cross-section and the panel portion along the vehicle-length direction, the first cross-section being smaller in perimeter than the second cross-section.

\* \* \* \* \*